(12) United States Patent
Lange

(10) Patent No.: US 11,911,883 B2
(45) Date of Patent: Feb. 27, 2024

(54) HYDRAULIC TENSIONER AND METHOD OF TENSIONING

(71) Applicant: Tentec Limited, Pendeford (GB)

(72) Inventor: Edmund Joseph Lange, Oldbury (GB)

(73) Assignee: Tentec Limited, Wolverhampton (GB)

( * ) Notice: Subject to any disclaimer, the term of this patent is extended or adjusted under 35 U.S.C. 154(b) by 366 days.

(21) Appl. No.: 17/299,677

(22) PCT Filed: Dec. 4, 2019

(86) PCT No.: PCT/IB2019/060426
§ 371 (c)(1),
(2) Date: Jun. 3, 2021

(87) PCT Pub. No.: WO2020/115673
PCT Pub. Date: Jun. 11, 2020

(65) Prior Publication Data
US 2022/0032433 A1 Feb. 3, 2022

(30) Foreign Application Priority Data

Dec. 4, 2018 (GB) ...................................... 1819775

(51) Int. Cl.
*B25B 29/02* (2006.01)
*B23P 19/06* (2006.01)

(52) U.S. Cl.
CPC ............ *B25B 29/02* (2013.01); *B23P 19/067* (2013.01)

(58) Field of Classification Search
CPC ................................ B25B 29/02; B23P 19/067
See application file for complete search history.

(56) References Cited

U.S. PATENT DOCUMENTS 4,535,656 A 8/1985 Orban
5,271,297 A * 12/1993 Heiermann ............. B25B 13/48
81/55

(Continued)

FOREIGN PATENT DOCUMENTS

| GB | 1157220 A | 7/1969 |
| GB | 2556099 A | 5/2018 |
| RU | 2015871 C1 | 7/1994 |

*Primary Examiner* — David B. Thomas
(74) *Attorney, Agent, or Firm* — WIGGIN AND DANA LLP

(57) ABSTRACT

A hydraulic tensioner (1), comprising: a base (2); a piston (3) mounted for sliding motion relative to the base (2), the base (2) and the piston (3) defining a pressure space (4) therebetween and being arranged to be urged apart along an axis (8) upon introduction of a fluid into the pressure space (4), the tensioner (1) having an internal bore (6) along the axis (8) having first and second ends along the axis and comprising a threaded component having an internally threaded portion (7) at the first end and coupled to the piston (3); the tensioner (1) further comprising: a threaded stud (10) having an exterior thread which engages the internally threaded portion (7) of the threaded component; and a drive mechanism (12) arranged to transmit rotational motion from the second end of the internal bore (9) to the threaded stud; the tensioner being arranged such that rotational motion applied to the drive mechanism (12) at the second end causes rotation of the stud (10) relative to the threaded component, with the engagement of the exterior thread of the stud (10) and the internal thread of the threaded component causing the stud to move along the axis as it rotates.

15 Claims, 10 Drawing Sheets

(56) References Cited

U.S. PATENT DOCUMENTS

| | | | | |
|---|---|---|---|---|
| 5,330,159 A | * | 7/1994 | Heiermann | G21C 13/06 254/29 A |
| 10,569,401 B2 | * | 2/2020 | Ribault | B25B 29/02 |

* cited by examiner

HYDRAULIC TENSIONER AND METHOD OF TENSIONING

This invention relates to a hydraulic tensioner and a method of tensioning using such a tensioner.

Hydraulic tensioners are well known; we describe such a tensioner in our earlier United Kingdom Patent number GB2 457 138 B. They generally comprise a body and a piston, with a pressure space defined therebetween such that introduction of (e.g.) hydraulic fluid into the pressure space forces the piston and body apart. If the piston is coupled to the work piece to be tensioned (e.g. though a threaded stud), then this can be used to tension the work piece.

Many applications for hydraulic tensioners have limited space in which the tensioner can be used. In particular, height (that is, distance above the tensioner in the direction in which the tensioner pulls) can be limited significantly. Furthermore, for applications with limited access—for example, in the nacelle of wind turbines—it is often desired to take as few items as possible with a user making use of the tensioner. Previous attempts at solving this problem have generally used multiple components that must be assembled in the application space, which is undesirable.

Prior art single unit tools have generally involved a captive stud, but the length of the stud protruding from the tensioner in such a case has meant that such tensioners have been sufficiently long not be to acceptable in some applications.

As such, it would be desirable to provide a hydraulic tensioner with limited height requirements, and that required as few discrete items as possible.

According to a first aspect of the invention, there is provided a hydraulic tensioner, comprising:
- a base;
- a piston mounted for sliding motion relative to the base, the base and the piston defining a pressure space therebetween and being arranged to be urged apart along an axis upon introduction of a fluid into the pressure space, the tensioner having an internal bore along the axis having first and second ends along the axis and comprising a threaded component having an internally threaded portion at the first end and coupled to the piston;

the tensioner further comprising:
- a threaded stud having an exterior thread which engages the internally threaded portion of the threaded component; and
- a drive mechanism arranged to transmit rotational motion from the second end of the internal bore to the threaded stud;
- the tensioner being arranged such that rotational motion applied to the drive mechanism at the second end causes rotation of the stud relative to the threaded component, with the engagement of the exterior thread of the stud and the internal thread of the threaded component causing the stud to move along the axis as it rotates.

This allows for a reduced-height tensioner that can be provided as a single unit, which is useful in confined spaces and in situations where it is desired to make use of the minimum number of units.

Typically, the internal bore will comprise a wider section having a larger diameter than the internally threaded portion. The drive mechanism can then comprise a sleeve member in the wider section passing from the second end to the internally threaded portion, with the sleeve being coupled to the stud so as to transmit rotation of the sleeve to the stud.

The drive mechanism may comprise a coupling between the sleeve and the stud arranged so as to permit movement of the stud relative to the sleeve along the axis but to fix the stud and the sleeve relative to each other rotationally. The coupling may be a splined coupling, comprising complementary splines on the sleeve (typically internally) and on a member fixed to the stud.

The drive mechanism may comprise a drive member at the second end, having an engagement means for being driven by a user, rotation of the engagement means causing rotation of the sleeve. Typically, the engagement means will comprise a protrusion or recess to engage with a tool by means of which the drive member can be rotated.

The piston may also be provided with location for a tool to rotate the piston. This will allow the piston to be rotated so as to close up any gap that might be present once the stud is fully engaged in the item to be tensioned.

The threaded component may be the piston, or a part thereof. Alternatively, the threaded component may comprise an insert received within and which bears against the piston. In a further alternative, the threaded component may comprise a reaction nut which is threaded onto the stud and which is received within a recess in the piston, or which bears against an end surface of the piston.

The stud may have a length measured along the axis, which may be at most the same as a length of the internal bore along the same axis. The stud may have a retracted position where it is entirely received within the internal bore. The stud may also have an extended position, when it extends from the internal bore. Typically, at least 50%, if not 80% of a length of the stud will extend from the internal bore in the extended position.

The base and the piston may define a second chamber therebetween, which may be provided with a connection for a gas (such as air). Whilst a fluid can fill the (main) pressure space in order to apply tension, the second chamber can be used to return the tensioner to its original position (i.e. zero stroke). The connection may comprise a one-way valve, which allows has (such as air) to enter the second chamber but not escape. This has been found to function as a spring (a so-called "air spring").

According to a second aspect of the invention, there is provided a method of tensioning a work piece having a threaded bore, comprising:
- positioning the tensioner of the first aspect of the invention adjacent to the bore;
- using the drive mechanism to rotate the stud such that it extends from the tensioner and engages the threaded bore of the work piece; and
- introducing fluid into the pressure space in order to force the base and piston apart, so as to apply tension to the work piece.

The method may also comprise the step of rotating the piston once the stud has engaged the threaded bore of the work piece, so that the tensioner abuts a surface of the work piece adjacent to the threaded bore of the work piece.

The work piece may comprise a plurality of threaded bores. The method may comprise providing a plurality of the threaded bores with tensioners in accordance with the first aspect of the invention. The method may also comprise providing those threaded bores which have not been provided with tensioners with threaded tension retaining members, such as bolts with heads, or threaded studs with nuts. The method may comprise retaining the tension applied to the workspace with the tension retaining members, for example by rotating the bolts or nuts such that the heads or nuts are adjacent to a surface of the workpiece.

The method may also comprise, after the tension has been applied, returning the piston to a zero stroke position by pressurising the second chamber with a gas, such as air. The method may then comprise rotating the piston so as to bring the tensioner closer to the work piece.

The method can further comprise using the drive mechanism to retract the stud from the workpiece, and then typically removing the tensioner from the work piece.

Typically, the work piece may comprise a shrink disc.

There now follows, by way of example only, description of embodiments of the invention, described with reference to the accompanying drawings, in which.

Figure 1:
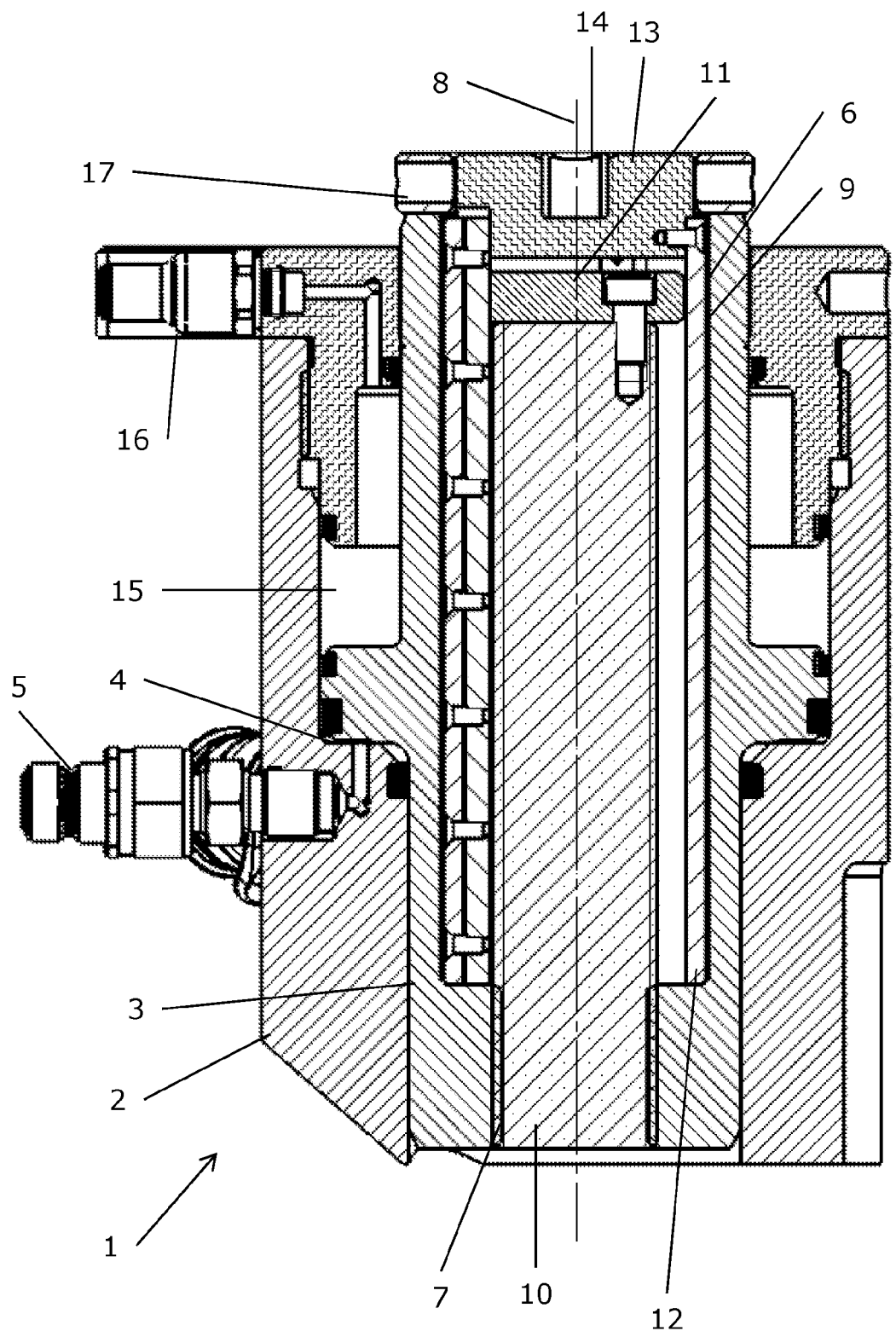
FIG. 1 shows a cross section through a hydraulic tensioner in accordance with a first embodiment of the invention, with its stud in a retracted state.
Figure 2:
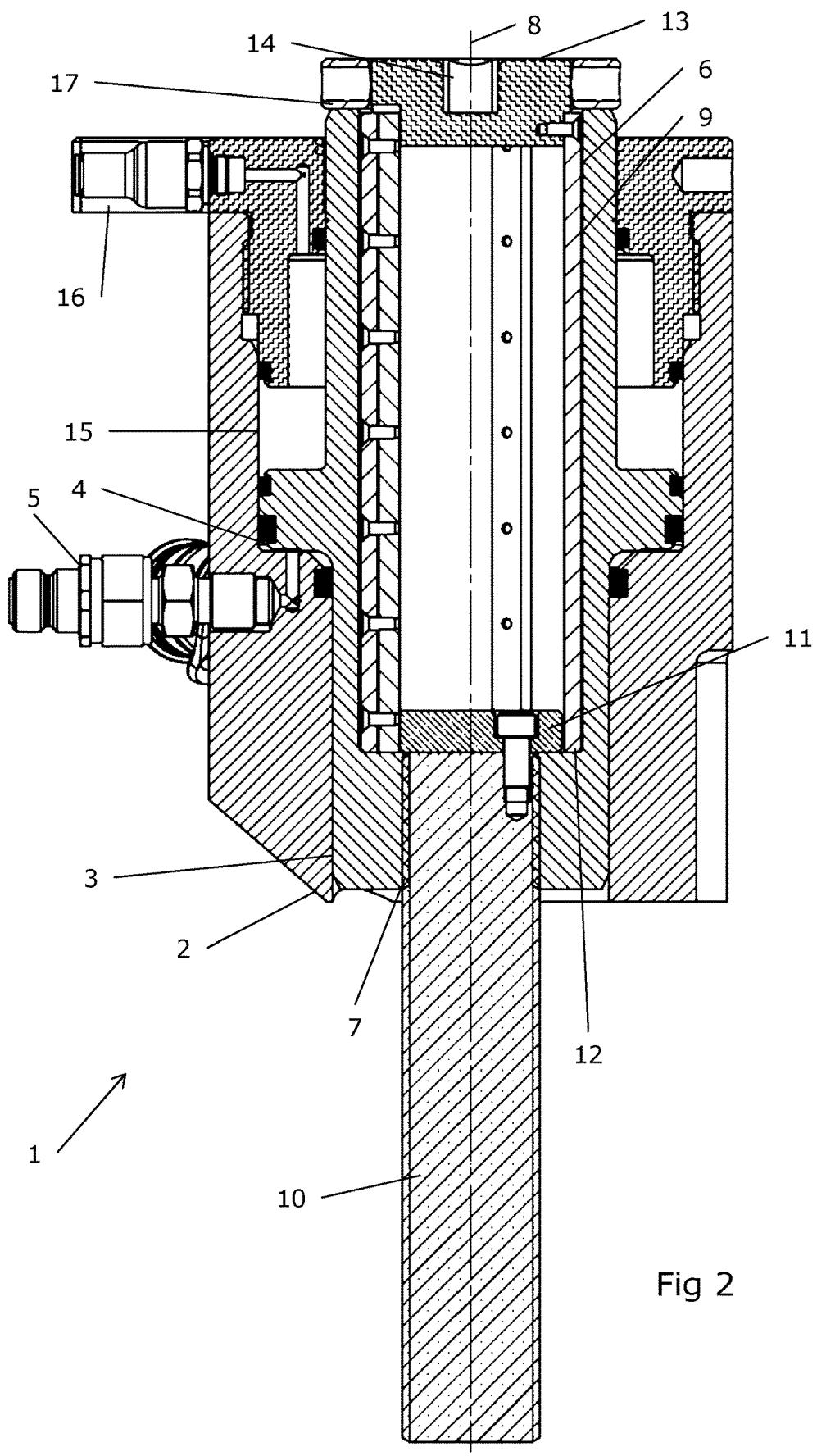
FIG. 2 shows a cross section through the tensioner of FIG. 1, with its stud in an extended state.

A hydraulic tensioner in accordance with a first embodiment of the invention is shown in FIGS. 1 and 2 of the accompanying drawings. The tensioner 1 comprises a body 2 and a piston 3. The piston 3 can more relative to the body 2, and there is a pressure space 4 defined between the piston 3 and the body 2. The pressure space 4 is provided with a fluid connection 5 by means of which fluid—typically hydraulic fluid—can be introduced into the pressure space 4. Doing so forces the piston 3 and body 2 apart along axis 8, such that (as shown in FIGS. 1 and 2), the piston 3 will move upwards relative to the body 2.

A second pressure space 15 is formed between the body 2 and piston 3, which is provided with a connection 16 for gas (e.g. air). As explained in our United Kingdom Patent GB 2 457 138B, this connection 16 is provided as a one-way valve, such that air is introduced into the space as the second pressure space 15 increases in size, but cannot escape when the second pressure space 15 decreases in size. As such, the second pressure space acts in a similar manner as a spring, tending to counteract the force generated by the introduction of hydraulic fluid into the (main) pressure space 4. The force generated by the second pressure space 15 is significantly lower than that generated by the introduction of hydraulic fluid into the main pressure space 4, but once that force is released, it tends to return the piston 3 to its original position relative to the body 2 (which is shown in FIGS. 1 and 2).

The piston 3 is provided with an internal bore 6 having an internally threaded part 7 at a first, bottom end and a wider (in terms of diameter) part 9 at the second, top end, all coaxial with axis 8. Within this bore 6 is provided a threaded stud 10, the external thread of which engages the internal thread of the internally threaded part 7 of the internal bore 6. The stud has a head 11 fixed to it.

Within the wider part 9 of the internal bore 6, there is provided a cylindrical sleeve 12. This is coupled to a drive member 13 at the top end, but runs the length of the wider portion 9. The sleeve 12 is internally splined, the head 11 having complementary splines. The drive member 13 has a square recess 14 (quarter inch/0.635 cm) for attachment of a tool.

As such, rotation of the drive member 13 at the top end will cause rotation of the sleeve 12. The internal splines of the sleeve 12 will cause the stud 10 to rotate. The threaded engagement of the stud 10 in the threaded portion 7 will then cause the stud 10 to move along the axis, from the retracted position shown in FIG. 1 where the stud 10 is entirely within the bore 6, to the extended position shown in FIG. 2 where the stud 10 is largely extended out of the bore 6. As the stud 10 moves along the axis 8, the splined connection of the head 11 and the sleeve 12 allows linear motion of the head 11 and the stud 10 along the axis 8, but does not allow the head 11 and the stud 10 to rotate relative to the sleeve 12.

The operation of this tensioner in tensioning (in this example) a shrink disc can be demonstrated with reference to FIGS. 3 to 12 of the accompanying drawings, which sequentially show the tensioner's use.

Figure 3:
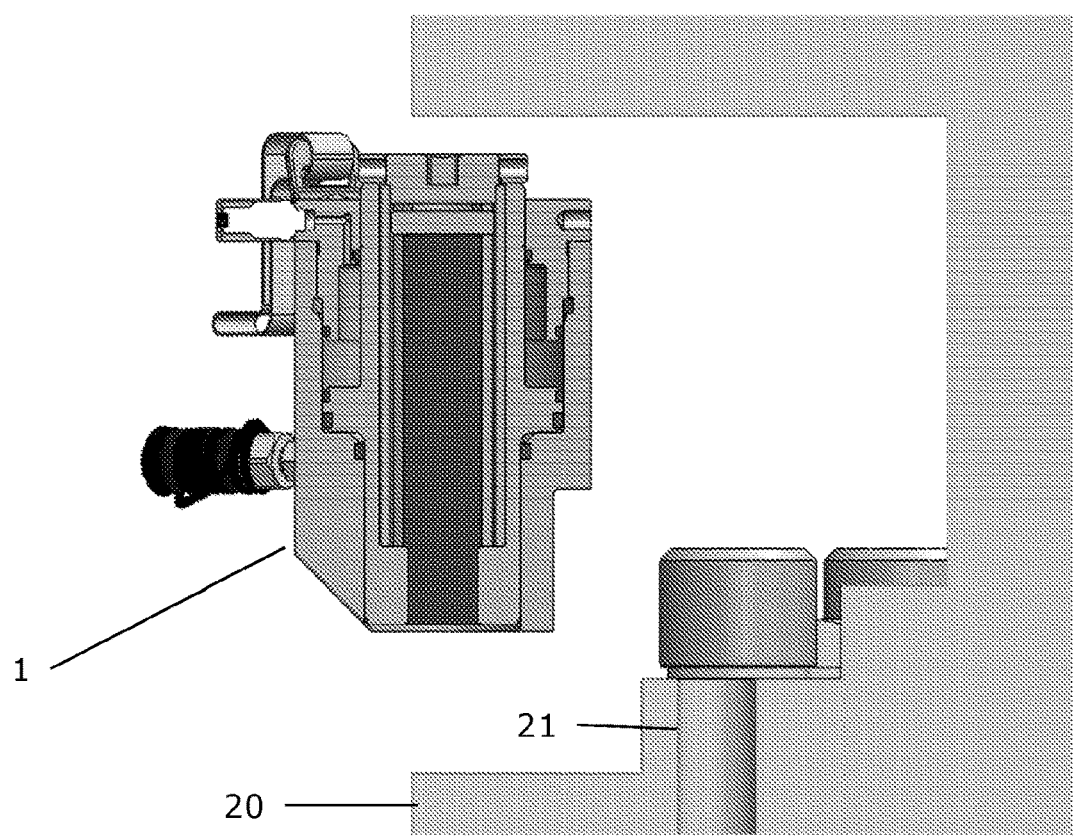
FIGS. 3 to 12 show sequentially the tensioner of FIG. 1 being used to tension a shrink disc.
Figure 4:
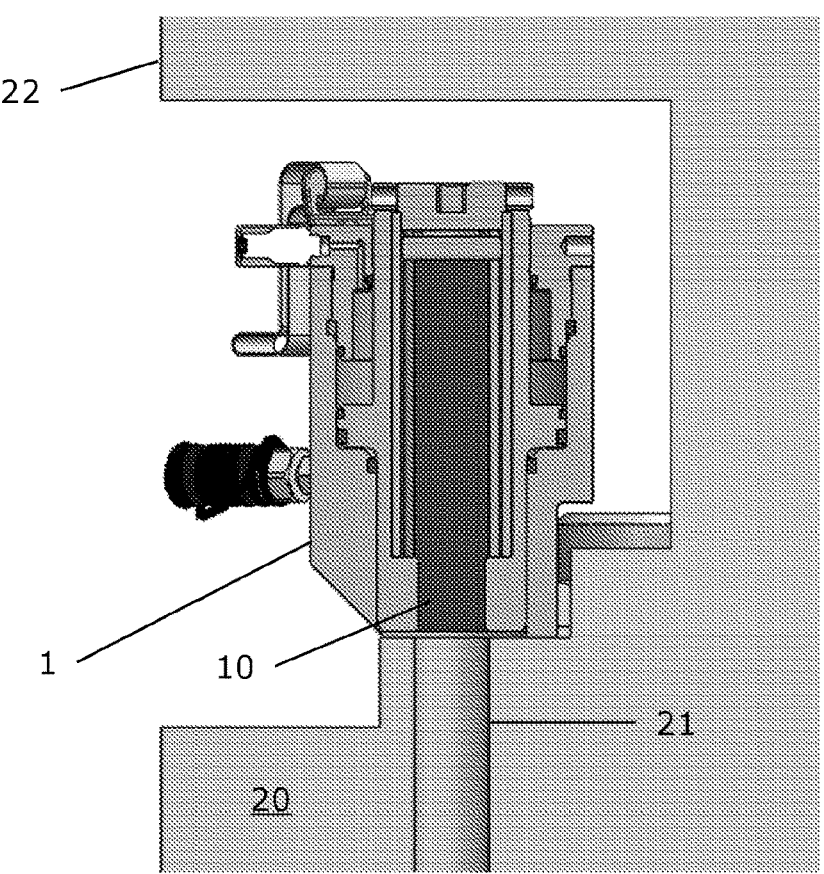

In FIG. 3, the tensioner 1 is brought to the work piece 20 (here, a shrink disc), which has a plurality of threaded bores 21. As shown in FIG. 4, the tensioner 1 is positioned so that the bottom face of the tensioner 1 is on the surface of the work piece, with the stud 10 over one of the threaded bores 21. As can be seen, the work piece comprises an overhang 22, so there is not a great deal of space available vertically over the threaded bores 21. Typically, a tensioner 1 would be provided for every other threaded bore 21; the remaining threaded bores would be provided with threaded nuts with hexagonal heads.

Figure 5:
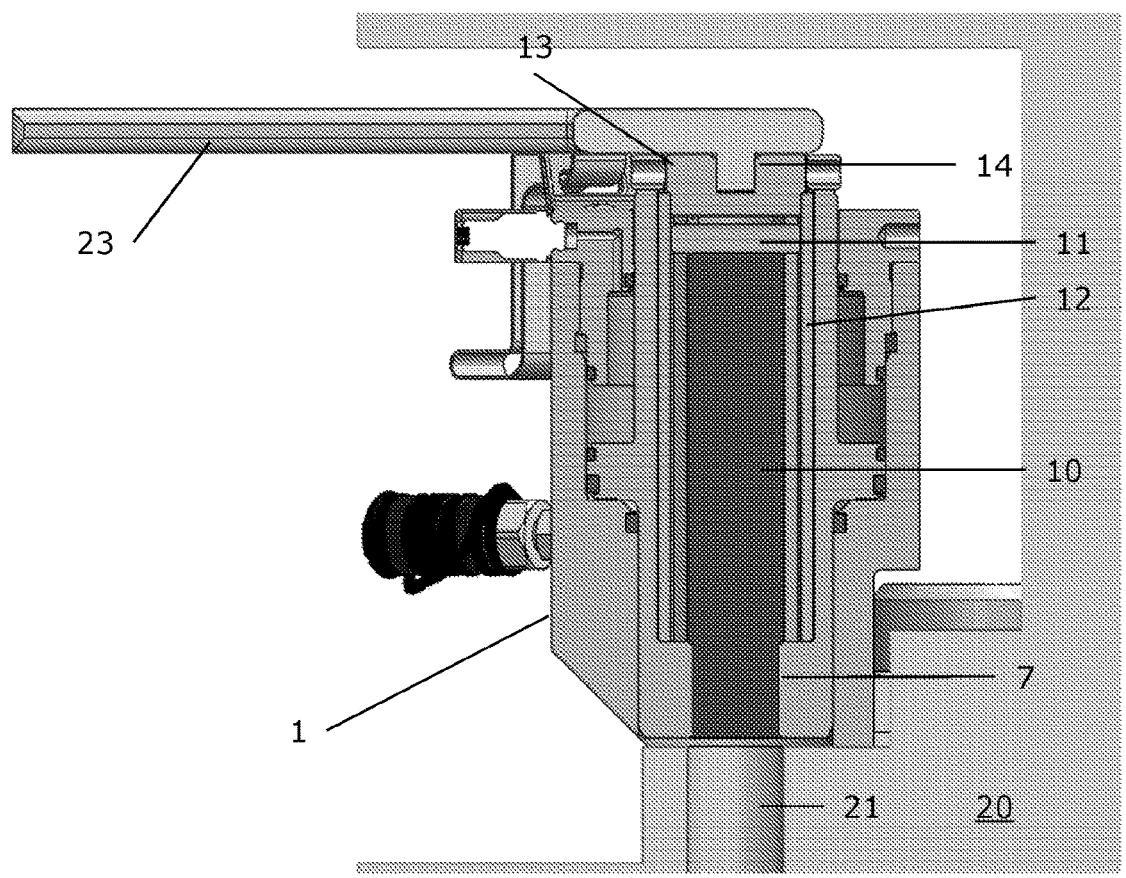
Figure 6:
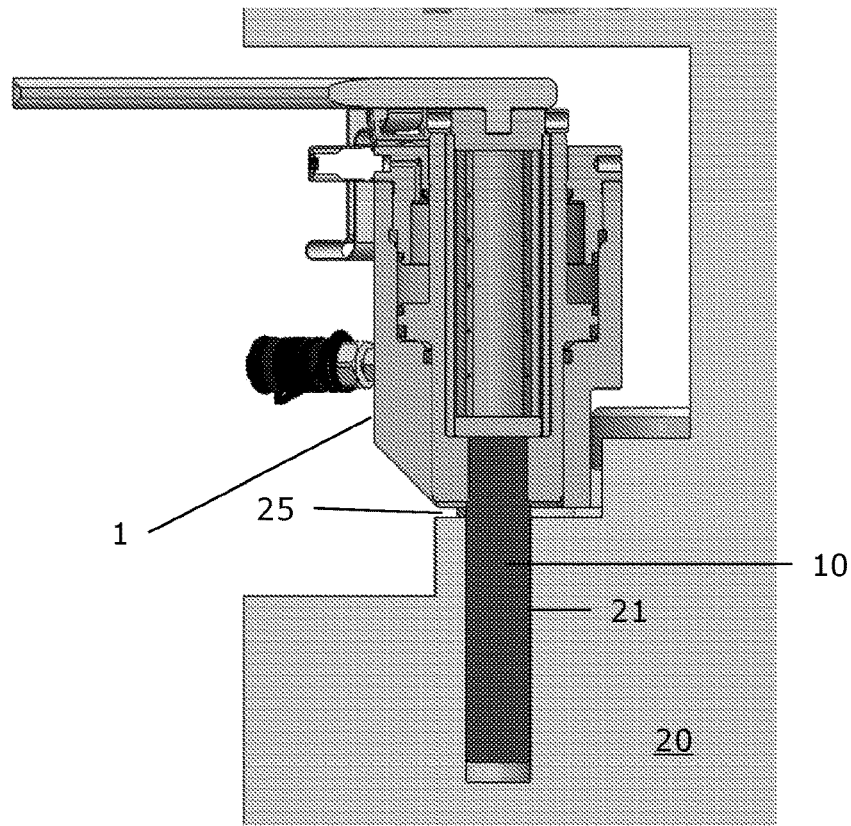

In FIG. 5, a ratchet drive tool 23 has engaged recess 14 in drive member 13. The tool 23 rotates the drive member 13, which rotates sleeve 12, which in turn rotates the head 11 fixed to stud 10. This causes the stud 10 to rotate. Because the stud 10 is engaged with threaded portion 7, the stud 10 is drive along axis 8 out of the bore 6, as shown in FIG. 6. The thread of the stud 10 engages that of the threaded bore 21.

Figure 7:
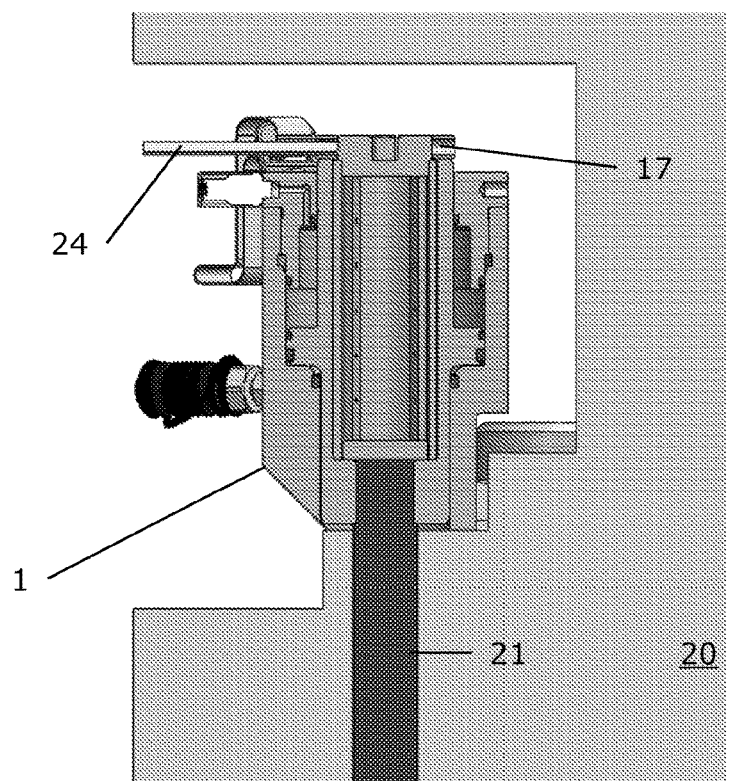
Figure 8:
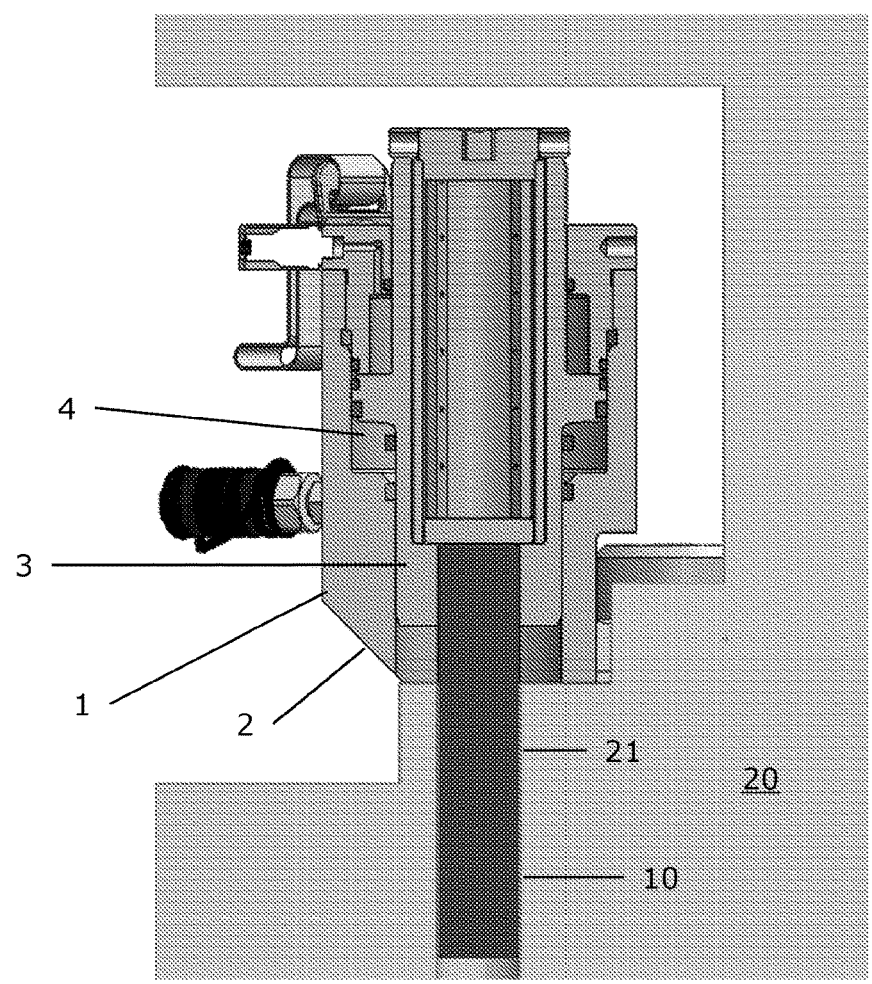

Once the stud 10 has reached its maximum travel, there will potentially be a gap of up to one pitch of the stud 10 thread between the tensioner 1 and the workpiece 20. In order to close this up, the piston 3 is provided with drive holes 17 by means of which the piston 3 can be rotated. By inserting a tommy bar 24 into one of these holes 17, the piston can be rotated so that any gap 25 is closed up as shown in FIG. 7.

The pressure space 4 can then be filled with pressurised hydraulic fluid, so as to drive the piston 3 upwards with respect to body 2. This has the effect of pulling the stud 10 up in the threaded bore 21, thus tensioning the work piece 20. The tensioner 1 can be pressurised so as to produce its maximum stroke, which is demonstrated by a thin red line (not shown) appearing at the top edge of the piston 3.

When the appropriate loading is reached, the nuts (not shown) in the other threaded bores (not shown) would be run down so as to capture the tension created.

Figure 9:
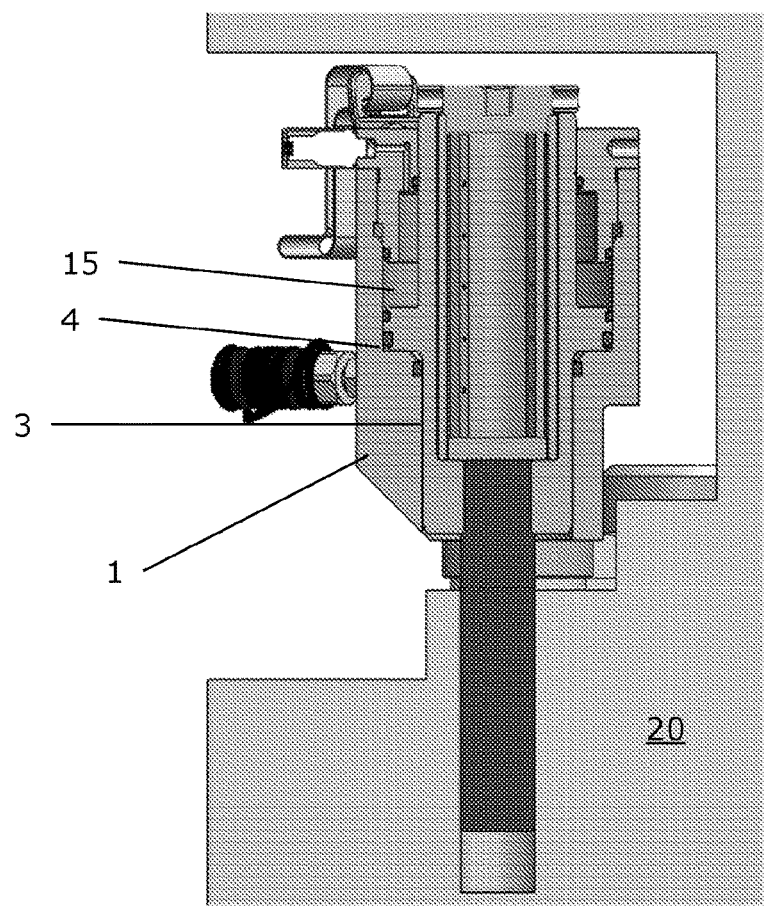

The hydraulic pressure in space 4 can then be released, and the air captured in second pressure space 15 will cause the piston 3 to retract back to its original position as shown in FIG. 9. This will lift the tensioner 1 off the surface of the work piece 20.

Figure 10:
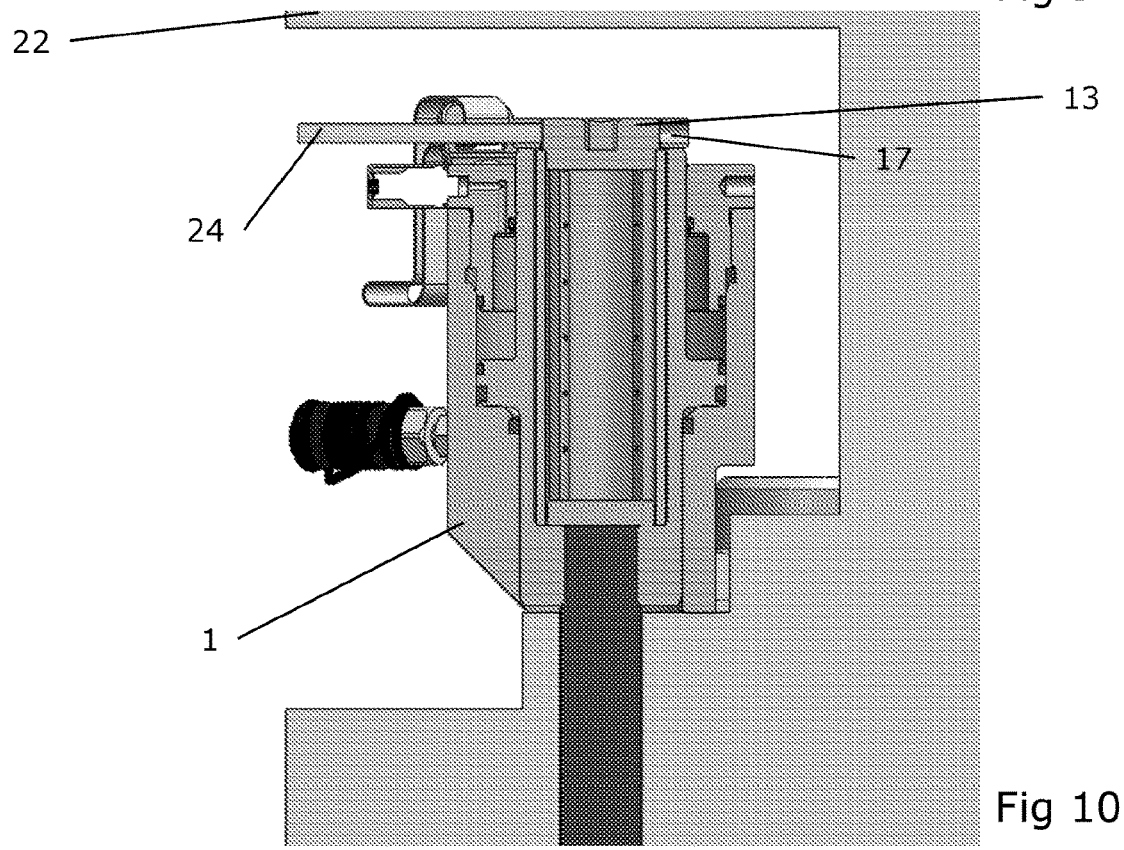

If there is now insufficient space between the overhang 22 to engage ratchet tool 23, the tommy bar 24 can again be used in hole 17 to rotate the tensioner 1 so that it is flush against the surface of work piece 20, as shown in FIG. 10.

Figure 11:
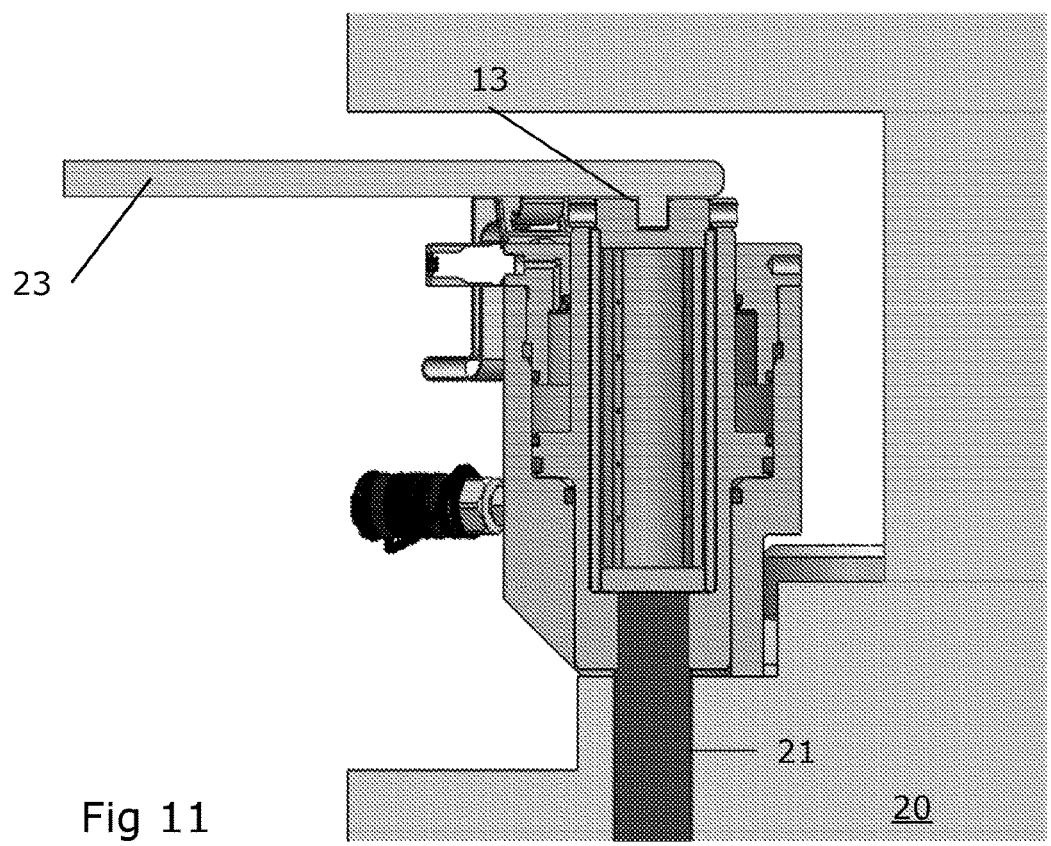

The ratchet tool 23 can then be reintroduce into drive member 13 as shown in FIG. 11, and used to drive the stud in the opposite direction as previously, in order to retract the stud 10 from threaded bore 21, as shown in FIG. 11.

Figure 12:
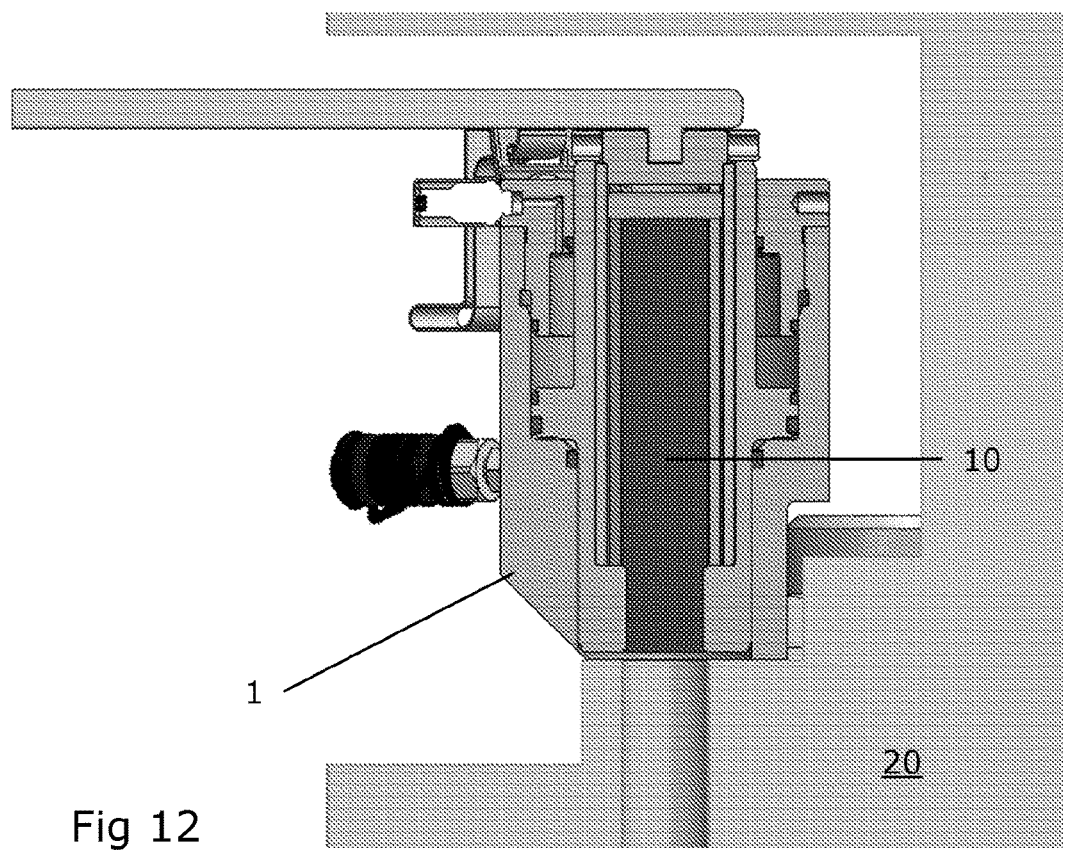

Once stud 10 is retracted as shown in FIG. 12, the tensioner 1 can be removed from workpiece 20. The work piece 20 has been tensioned; the nuts can be tightened with a torque wrench if desired.

Thus, a single unit tensioner that has limited height requirements is provided.

Figure 13:
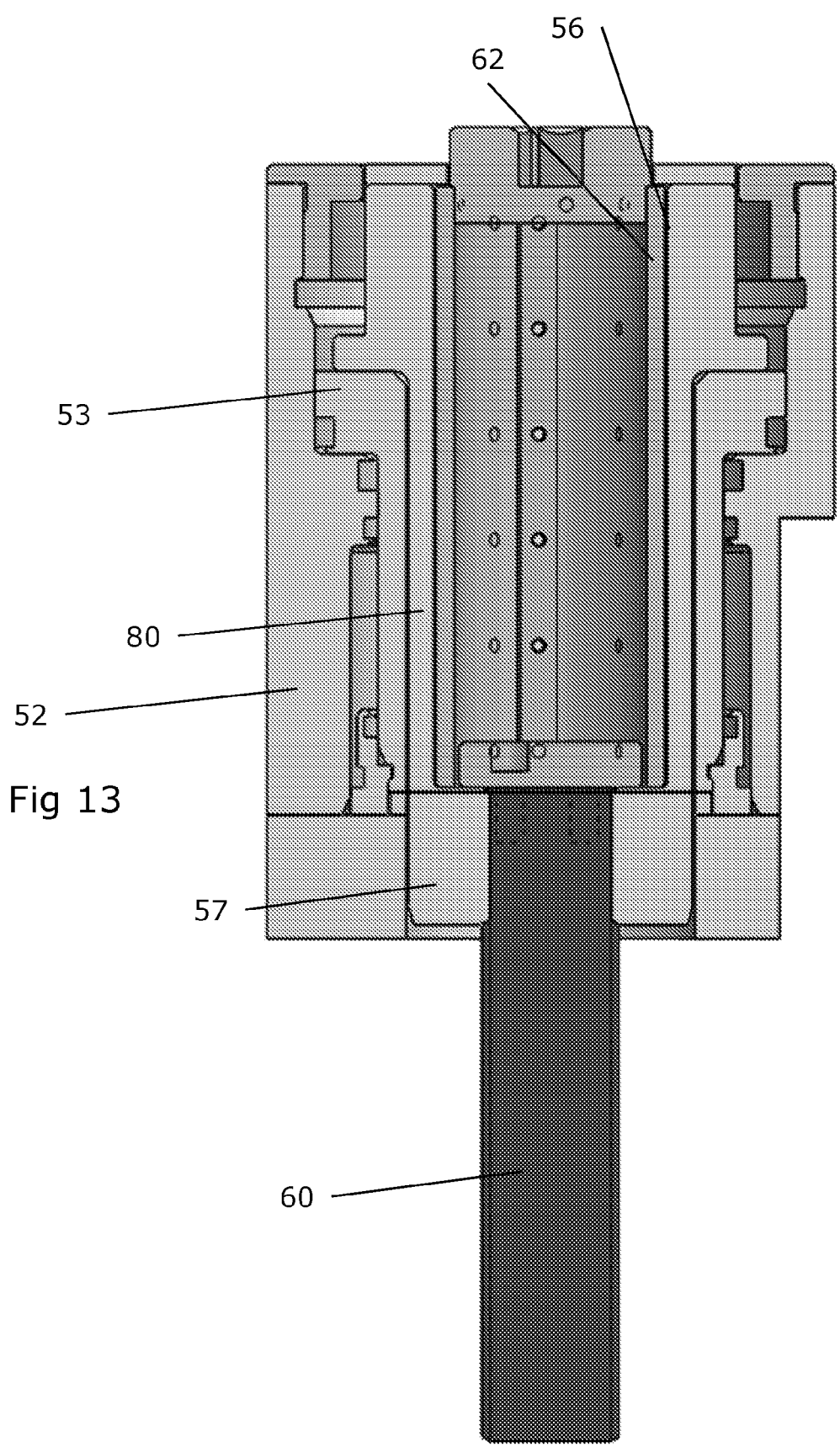
FIG. 13 shows a cross section through a tensioner in accordance with a second embodiment of the invention.

A second embodiment of the invention is shown in FIG. 13 of the accompanying drawings; equivalent features to those of the first embodiment have been given corresponding reference numerals, raised by 50.

In this embodiment, the threaded portion 57 is formed in an insert 80 separate from the piston 53. This insert 80 is a sliding fit within the piston 53 and has a flange 81 at the second end which bears against the piston 53. Thus, as the piston 53 is forced apart from the body 52, the piston will react against the flange 81, transmitting force from the piston 53 through the insert 80 to the threaded stud 60. The internal bore 56 is therefore formed within the insert 80, which then contains the sleeve 62. This embodiment otherwise functions as described above with respect to the first embodiment of the invention.

Figure 14:
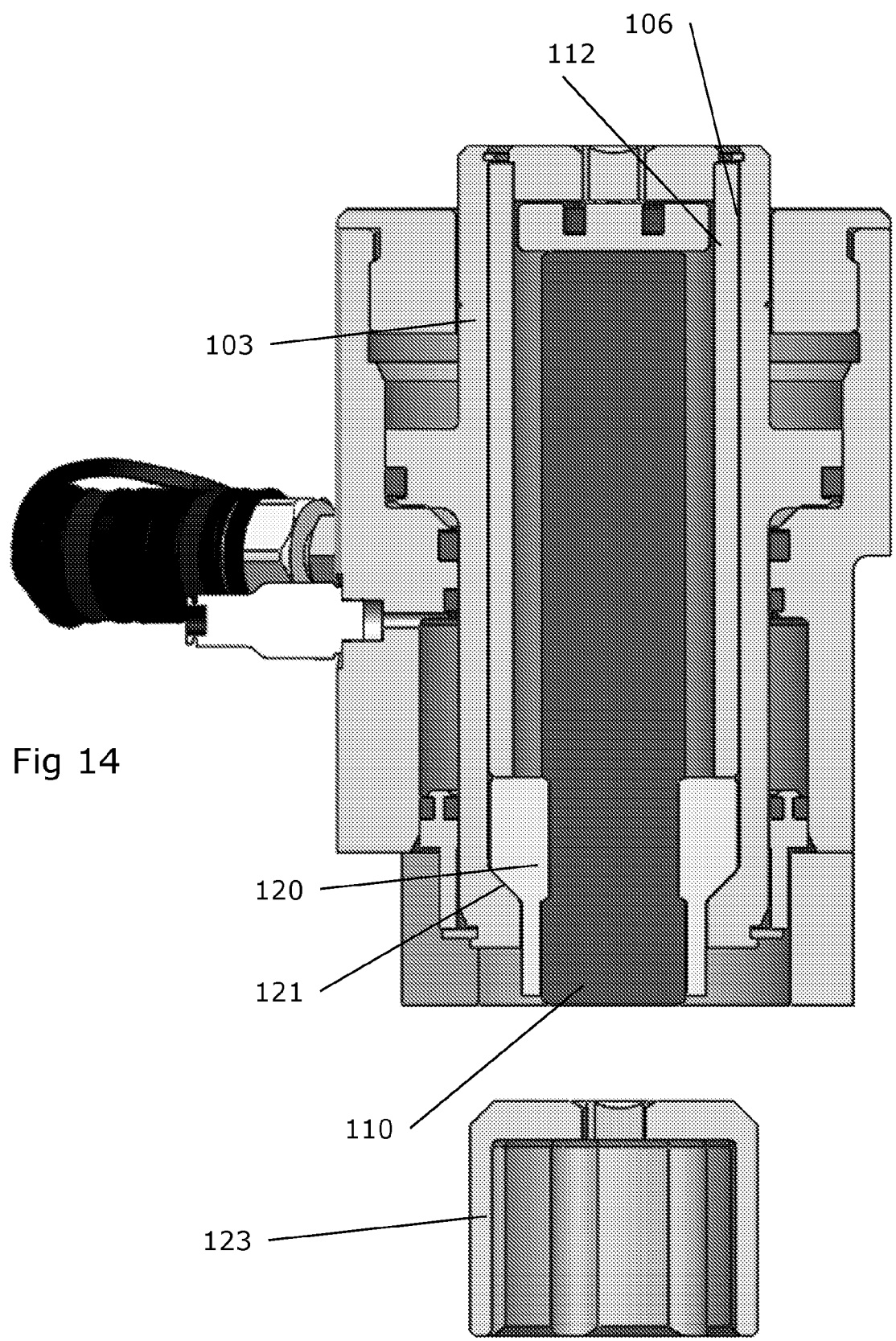
FIG. 14 shows a cross section through a tensioner in accordance with a third embodiment of the invention.
Figure 15:
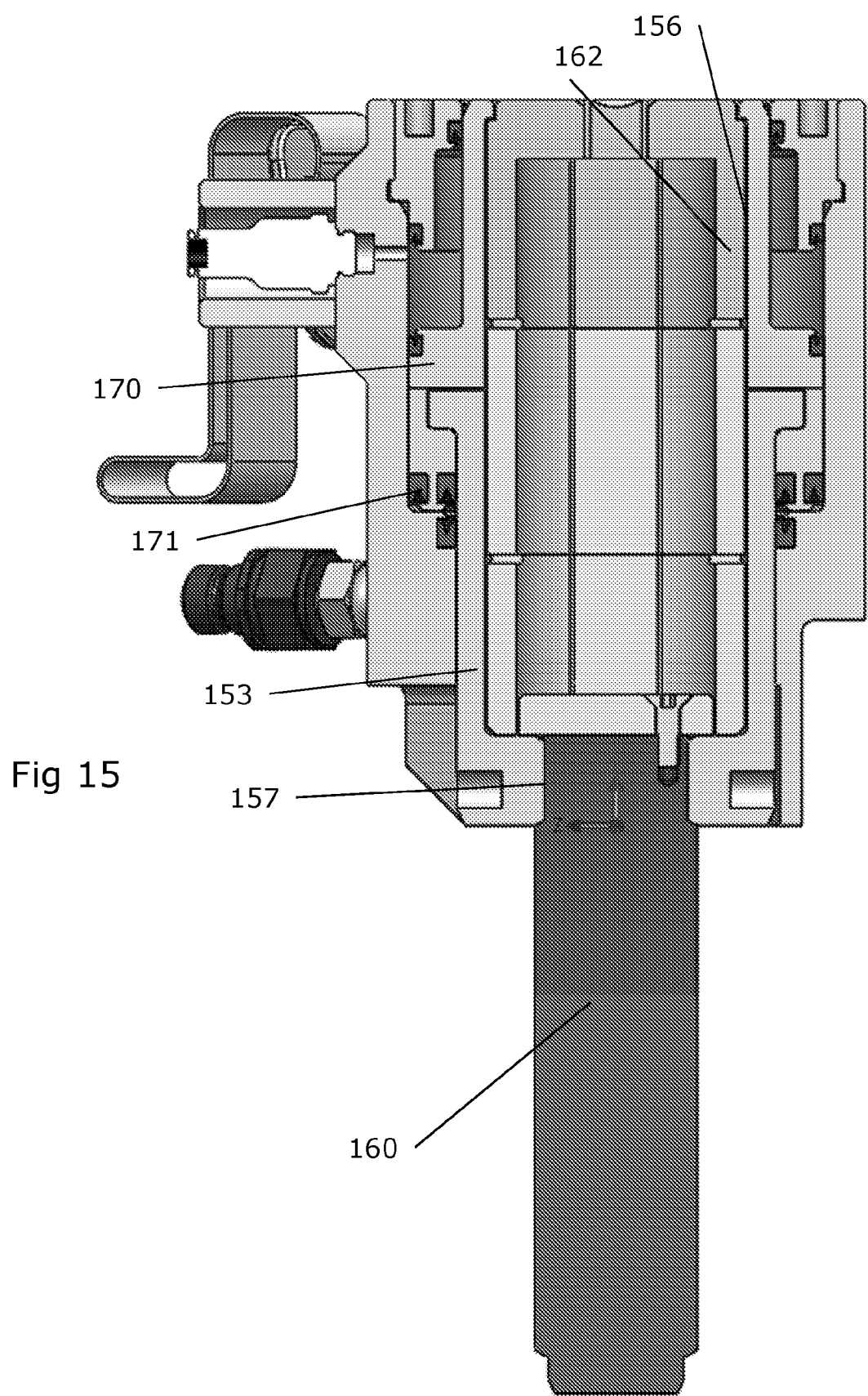
FIG. 15 shows a cross section through a tensioner in accordance with a fourth embodiment of the invention.

A third embodiment of the invention can be seen in FIG. 14 of the invention equivalent features to those of the first embodiment have been given corresponding reference numerals, raised by 100.

In this embodiment, rather than the piston or an insert carrying the internally threaded portion, this is carried on a reaction nut 120. The internal bore 106 is within the piston 103 once more, and has a tapered recess 121 for the reaction nut 120. As such, when the piston is urged upwards (as shown in FIG. 14) by the introduction of hydraulic pressure, the piston will force reaction nut 120 upwards. Reaction nut 120 is threaded onto the stud 110, so as to have the force from piston 103 transferred to it by the reaction nut 120. A separate load retaining nut 123 is provided, which can be run down the stud 110 once load has been applied to it.

Again, the third embodiment otherwise functions as the first embodiment, with the sleeve 112 working within the internal bore 106 in the piston 103.

A fourth embodiment of the invention can be seen in FIG. 14 of the invention equivalent features to those of the first embodiment have been given corresponding reference numerals, raised by 150.

In this embodiment, the piston 153 again provides the internally threaded portion 157 and is threaded onto stud 160. However, the internal bore 156 is formed in multiple components: the piston 153 and a floating member 170. The sleeve 162 therefore sits within these two components. This is advantageous because it results in less wear on the pressure seals 171 and less effort for the operator as they only need to rotate the piston 153 against one set of seals 171 rather than against 3 or 4 as in the first embodiment.

Otherwise, this embodiment functions as described in the first embodiment.

The invention claimed is:

1. A hydraulic tensioner, comprising:
   a base;
   a piston mounted for sliding motion relative to the base, the base and the piston defining a pressure space therebetween and being arranged to be urged apart along an axis upon introduction of a fluid into the pressure space, the tensioner having an internal bore along the axis having first and second ends along the axis and comprising a threaded component having an internally threaded portion at the first end and coupled to the piston;
   the tensioner further comprising:
   a threaded stud having an exterior thread which engages the internally threaded portion of the threaded component; and
   a drive mechanism arranged to transmit rotational motion from the second end of the internal bore to the threaded stud;
   the tensioner being arranged such that rotational motion applied to the drive mechanism at the second end causes rotation of the stud relative to the threaded component, with the engagement of the exterior thread of the stud and the internal thread of the threaded component causing the stud to move along the axis as it rotates.

2. The tensioner of claim 1, in which the internal bore comprises a wider section having a larger diameter than the internally threaded portion, the drive mechanism comprising a sleeve member in the wider section passing from the second end to the internally threaded portion, with the sleeve being coupled to the stud so as to transmit rotation of the sleeve to the stud.

3. The tensioner of claim 2, in which the drive mechanism comprises a coupling between the sleeve and the stud arranged so as to permit movement of the stud relative to the sleeve along the axis but to fix the stud and the sleeve relative to each other rotationally.

4. The tensioner of claim 3, in which the coupling is a splined coupling, comprising complementary splines on the sleeve and on a member fixed to the stud.

5. The tensioner of claim 1, in which the drive mechanism comprises a drive member at the second end, having an engagement means for being driven by a user, rotation of the engagement means causing rotation of the sleeve.

6. The tensioner of claim 1, in which the piston is provided with location for a tool to rotate the piston.

7. The tensioner of claim 1, in which the stud has a retracted position where it is entirely received within the internal bore.

8. The tensioner of claim 1, in which threaded component is the piston, or a part thereof.

9. The tensioner of claim 1, in which the threaded component comprises an insert received within and which bears against the piston.

10. The tensioner of claim 1, in which the threaded component comprises a reaction nut which is threaded onto the stud and which is received within a recess in the piston, or which bears against an end surface of the piston.

11. A method of tensioning a work piece having a threaded bore, comprising:
    positioning a tensioner in accordance with claim adjacent to the bore;
    using the drive mechanism to rotate the stud such that it extends from the tensioner and engages the threaded bore of the work piece; and
    introducing fluid into the pressure space in order to force the base and piston apart, so as to apply tension to the work piece.

12. The method of claim 11, comprising the step of rotating the piston once the stud has engaged the threaded bore of the work piece, so that the tensioner abuts a surface of the work piece adjacent to the threaded bore of the work piece.

13. The method of claim 11, in which the work piece comprises a plurality of threaded bores, the method comprising providing a plurality of the threaded bores with tensioners in accordance with claim.

14. The method of claim 13, comprising providing those threaded bores which have not been provided with tensioners with threaded tension retaining members.

15. The method of claim 11, in which the work piece comprises a shrink disc.

\* \* \* \* \*